(12) United States Patent
Muralikrishnan et al.

(10) Patent No.: US 12,524,893 B2
(45) Date of Patent: Jan. 13, 2026

(54) SHAPE SPACE GENERATION VIA PROGRESSIVE CORRESPONDENCE ESTIMATION

(71) Applicant: Adobe Inc., San Jose, CA (US)

(72) Inventors: Sanjeev Muralikrishnan, London (GB); Chun-Hao Huang, London (GB); Duygu Ceylan Aksit, London (GB); Niloy J. Mitra, Potters Bar (GB)

(73) Assignee: Adobe Inc., San Jose, CA (US)

( * ) Notice: Subject to any disclaimer, the term of this patent is extended or adjusted under 35 U.S.C. 154(b) by 210 days.

(21) Appl. No.: 18/369,958

(22) Filed: Sep. 19, 2023

(65) Prior Publication Data

US 2025/0095172 A1   Mar. 20, 2025

(51) Int. Cl.
*G06T 7/38* (2017.01)
*G06T 7/73* (2017.01)
*G06T 17/10* (2006.01)

(52) U.S. Cl.
CPC .................. *G06T 7/38* (2017.01); *G06T 7/75* (2017.01); *G06T 17/10* (2013.01); *G06T 2207/20081* (2013.01)

(58) Field of Classification Search
CPC ............. G06T 7/38; G06T 7/75; G06T 17/10; G06T 2207/20081
See application file for complete search history.

(56) References Cited

U.S. PATENT DOCUMENTS

| | | | |
|---|---|---|---|
| 10,813,715 B1* | 10/2020 | Chojnowski | G06F 3/0304 |
| 12,236,517 B2* | 2/2025 | Bradley | G06T 7/62 |
| 2016/0371542 A1* | 12/2016 | Sugita | G06T 19/00 |
| 2018/0315230 A1* | 11/2018 | Black | G06T 19/20 |
| 2020/0058137 A1* | 2/2020 | Pujades | G06V 40/23 |
| 2023/0169727 A1* | 6/2023 | Sminchisescu | G06N 3/0455 |
| | | | 345/419 |
| 2023/0281921 A1* | 9/2023 | Miao | G06T 17/00 |
| | | | 345/420 |

OTHER PUBLICATIONS

SizeUSA Dataset, Available online at: https://www.tc2.com/size-USA.html, 2017.

(Continued)

*Primary Examiner* — Utpal D Shah
(74) *Attorney, Agent, or Firm* — Kilpatrick Townsend & Stockton LLP

(57) ABSTRACT

In some examples, a computing system access a set of registered three-dimensional (3D) digital shapes. The set of registered 3D digital shapes are registered to a shape template. The computing system determines a linear model for an estimate of the shape space using a first subset of the set of registered 3D digital shapes. The computing system then determines a nonlinear deformation model for the shape space using a second subset of the set of registered 3D digital shapes. An unregistered shape can be registered to the shape space using the linear model and the nonlinear deformation model. The registration can be added to the set of registered 3D digital shapes to update the estimate of the shape space if a shape distance between the registration and the unregistered shape is below a threshold value.

20 Claims, 7 Drawing Sheets

(56) References Cited

OTHER PUBLICATIONS

Aigerman et al., Neural Jacobian Fields: Learning Intrinsic Mappings of Arbitrary Meshes, ACM Trans. Graph., vol. 41, No. 4, Jul. 2022, pp. 1-17.
Anguelov et al., SCAPE: Shape Completion and Animation of People, ACM Transactions on Graphics (TOG), ACM, 2005, pp. 408-416.
Aubry et al., The Wave Kernel Signature: A Quantum Mechanical Approach to Shape Analysis, 2011 IEEE International Conference on Computer Vision Workshops (ICCV Workshops), Nov. 6-13, 2011, 8 pages.
Azencot et al., Consistent Shape Matching via Coupled Optimization, Computer Graphics Forum, vol. 38, No. 5, Available Online at: https://doi.org/10.1111/cgf.13786, Aug. 12, 2019, 13 pages.
Bellekens et al., A Survey of Rigid 3D Pointcloud Registration Algorithms, Conference: Ambient 2014: The Fourth International Conference on Ambient Computing, Applications, Services and Technologies, 2014, pp. 8-13.
Besl et al., A Method for Registration of 3-D Shapes, IEEE Transactions on Pattern Analysis and Machine Intelligence, vol. 14, No. 2, Feb. 1992, pp. 239-256.
Blanz et al., A Morphable Model for the Synthesis of 3D Faces, SIGGRAPH '99, Proceedings of the 26th Annual Conference on Computer Graphics and Interactive Techniques, Jul. 1999, pp. 187-194.
Bogo et al., Detailed Full-Body Reconstructions of Moving People from Monocular RGB-D Sequences, In ICCV '11 Proceedings International Conference on Computer Vision, Dec. 2015, pp. 2300-2308.
Boscaini et al., Learning Shape Correspondence with Anisotropic Convolutional Neural Networks, Computer Vision and Pattern Recognition, May 20, 2016, 9 pages.
Chen et al., Object Modeling by Registration of Multiple Range Images, Proceedings of the 1991 Institute of Electrical and Electronics Engineers, International Conference on Robotics and Automation, Sacramento, California, Apr. 1991, pp. 2724-2729.
Chen et al., Robust Nonrigid Registration by Convex Optimization, 2015 IEEE International Conference on Computer Vision (ICCV), Dec. 7-13, 2015, 10 pages.
Cootes et al., Active Shape Models-their Training and Application, Computer Vision and Image Understanding, vol. 61, No. 1, Jan. 1995, pp. 38-59.
Dale et al., Video face replacement., In ACM Transactions on Graphics (Proc. SIGGRAPH Asia), Dec. 2011, pp. 1-10.
Deng et al., A Survey of Non-rigid 3D Registration, STAR—State of The Art Report, vol. 41, No. 2, 2022, 31 pages.
Deng et al., NASA: Neural Articulated Shape Approximation, Available Online at: https://arxiv.org/pdf/1912.03207.pdf, Aug. 2020, 21 pages.
Dou et al., 3D Scanning Deformable Objects with a Single RGBD Sensor, Available Online at: https://www.cs.toronto.edu/~jtaylor/papers/CVPR2015-ScanningDeformableObjects.pdf, 2015, pp. 493-501.
Dou et al., Fusion4D: Real-time Performance Capture of Challenging Scenes, ACM Transactions on Graphics, vol. 35, Issue 4, Jul. 11, 2016, pp. 1-13.
Egger et al., 3D Morphable Face Models—Past, Present and Future, Computer Vision and Pattern Recognition, Apr. 16, 2020, 39 pages.
Garrido et al., Automatic Face Reenactment, Proceedings of the 2014 IEEE Conference on Computer Vision and Pattern Recognition, Sep. 2014, 8 pages.
Ghorbani et al., MoVi: a Large Multi-purpose Human Motion and Video Dataset, PloS One, vol. 16, No. 6, Jun. 17, 2021, pp. 1-15.
Groueix et al., 3D-Coded: 3D Correspondences by Deep Deformation, Proceedings of the European Conference on Computer Vision (ECCV), Jul. 27, 2018, pp. 1-23.
Hirshberg et al., Coregistration: Simultaneous Alignment and Modeling of Articulated 3D Shape, Conference: Proceedings of the 12th European Conference on Computer Vision—vol. Part VI, Oct. 2012, 14 pages.
Hu et al., Avatar Digitization from a Single Image for Real-time Rendering, ACM Transactions on Graphics, vol. 36, No. 6, Nov. 20, 2017, pp. 195:1-195:14.
Huang et al., A Bayesian Approach to Multi-view 4D Modeling, International Journal of Computer Vision, vol. 116, No. 2, Jun. 2015, 21 pages.
Huang et al., ARAPReg: An As-Rigid-As Possible Regularization Loss for Learning Deformable Shape Generators, Computer Vision and Pattern Recognition, Sep. 21, 2021, 17 pages.
Huang et al., Tracking-by-Detection of 3D Human Shapes: From Surfaces to Volumes, IEEE Transactions on Pattern Analysis and Machine Intelligence, vol. 40, No. 8, Aug. 2018, 15 pages.
Joo et al., Total Capture: A 3D Deformation Model for Tracking Faces, Hands, and Bodies, IEEE/CVF Conference on Computer Vision and Pattern Recognition, Jun. 18, 2018, pp. 8320-8329.
Li et al., Global Correspondence Optimization for Non-Rigid Registration of Depth Scans, Computer Graphics Forum, vol. 27, No. 5, Available Online at: http://dl.acm.org/citation.cfm?id=1731309.1731326, Jul. 2, 2008, pp. 1421-1430.
Loper et al., SMPL: A Skinned Multi-Person Linear Model, ACM Transactions on Graphics, vol. 34, No. 6, Nov. 2, 2015, pp. 1-16.
Mahmood et al., AMASS: Archive of Motion Capture as Surface Shapes, Computer Vision and Pattern Recognition, Apr. 5, 2019, 12 pages.
Mihajlovic et al., COAP: Compositional Articulated Occupancy of People, Computer Vision and Pattern Recognition, Apr. 13, 2022, 12 pages.
Mihajlovic et al., LEAP: Learning Articulated Occupancy of People, in Proceedings of the IEEE/CVF Conference on Computer Vision and Pattern Recognition, Apr. 14, 2021, 17 pages.
Monti et al., Geometric Deep Learning on Graphs and Manifolds Using Mixture Model CNNs, Computer Vision and Pattern Recognition, Available Online at: https://arxiv.org/pdf/1611.08402.pdf, Dec. 6, 2016, pp. 1-13.
Muralikrishnan et al., GLASS: Geometric Latent Augmentation for Shape Spaces, Computer Vision and Pattern Recognition, Apr. 29, 2022, 14 pages.
Osman et al., STAR: Sparse Trained Articulated Human Body Regressor, Computer Vision and Pattern Recognition, Aug. 19, 2020, 18 pages.
Osman et al., SUPR: A Sparse Unified Part-Based Human Representation, Computer Vision and Pattern Recognition, Oct. 25, 2022, 43 pages.
Pavlakos et al., Expressive Body Capture: 3D Hands, Face, and Body from a Single Image, In Proceedings IEEE Conference on Computer Vision and Pattern Recognition (CVPR), Apr. 11, 2019, pp. 10975-10985.
Pons-Moll et al., Dyna: A Model of Dynamic Human Shape in Motion, ACM Transactions on Graphics, vol. 34, No. 4, Jul. 27, 2015, pp. 1-14.
Qi et al., PointNet: Deep Learning on Point Sets for 3D Classification and Segmentation, IEEE Conference on Computer Vision and Pattern Recognition (CVPR), Apr. 10, 2017, pp. 652-660.
Ren et al., Discrete Optimization for Shape Matching, Computer Graphics Forum, vol. 40, No. 5, Aug. 2021, 16 pages.
Robinette et al., Civilian American and European Surface Anthropometry Resource (CAESAR) Final Report, Technical Report AFRL-HE-WP-TR-2002-0169, US Air Force Research Laboratory, Jun. 2002, 70 pages.
Romero et al., Embodied Hands: Modeling and Capturing Hands and Bodies Together, ACM Transactions on Graphics, vol. 36, No. 6, Nov. 2017, pp. 1-17.
Salti et al., SHOT: Unique Signatures of Histograms for Surface and Texture Description, Computer Vision and Image Understanding, vol. 125, Aug. 2014, pp. 251-264, Abstract pp. 1-8.
Sorkine et al., As-Rigid-As-Possible Surface Modeling, SGP '07: Proceedings of the fifth Eurographics symposium on Geometry processing, vol. 4, Jul. 2007, 8 pages.

(56) References Cited

OTHER PUBLICATIONS

Sorkine et al., Laplacian Surface Editing, in Proceedings of the Eurographics/ACM SIGGRAPH Symposium on Geometry Processing, Jul. 2004, pp. 175-184.

Sun et al., A Concise and Provably Informative Multi-Scale Signature Based on Heat Diffusion, Computer Graphics Forum, vol. 28, No. 5, Aug. 31, 2009, 10 pages.

Thies et al., Real-Time Expression Transfer for Facial Reenactment, Association for Computing Machinery Transactions on Graphics, vol. 34, No. 6, Oct. 2015, 14 pages.

Tian et al., Recovering 3D Human Mesh from Monocular Images: A Survey, Available Online at: https://arxiv.org/pdf/2203.01923.pdf, Aug. 25, 2023, pp. 1-25.

Tiwari et al., Neural-GIF: Neural Generalized Implicit Functions for Animating People in Clothing, IEEE/CVF International Conference on Computer Vision (ICCV), Aug. 2021, pp. 11708-11718.

Wei et al., Dense Human Body Correspondences Using Convolutional Networks, IEEE Conference on Computer Vision and Pattern Recognition (CVPR), vol. 1, Jun. 2016, pp. 1544-1553.

Wood et al., Fake it Till You Make it: Face Analysis in the Wild Using Synthetic Data Alone, Available Online at: https://arxiv.org/pdf/2109.15102.pdf, Oct. 5, 2021, 11 pages.

Xie et al., Neural Fields in Visual Computing and Beyond, Eurographics, vol. 41, No. 2, Available Online at: https://arxiv.org/pdf/2111.11426.pdf, May 24, 2022, 36 pages.

Xu et al., DenseRaC: Joint 3D Pose and Shape Estimation by Dense Render-and-Compare, IEEE/CVF International Conference on Computer Vision (ICCV), Oct. 2019, pp. 7760-7770.

Xu et al., GHUM & GHUML: Generative 3D Human Shape and Articulated Pose Models, IEEE/CVF Conference on Computer Vision and Pattern Recognition (CVPR), Jun. 1, 2020, pp. 6184-6193.

\* cited by examiner

| Method | $\|R_d\|$ | initial $\|R_{pca}\|$ | $\|R_{proposal}\|$ | regularizations | # shapes $\in \mathcal{U}$ | v2v (↓) |
|---|---|---|---|---|---|---|
| (i) BASELINE1 - full PCA$_{11}$+NJF | 29 | 400 | 400 | x | x | 0.87 |
| (ii) BASELINE2 - PCA$_{11}$ + non-rigid | 229 | 100 | x | x | 800 | 3.11 |
| (iii) BASELINE3 - PCA$_{11}$ + non-rigid | 229 | 100 | x | small $\|\Delta w\|$ | 800 | 3.26 |
| Bootstrap (PCA11 only) | 229 | 100 | 100 | edge-preserving | 800 | 1.31 |
| Bootstrap (PCA11 + NJF) | 229 | 100 | 100 | x | 800 | 0.90 |

*FIG. 3*

| Method | # shapes ∈ 𝒰 | v2v (↓) (cm) | v2p (↓) (cm) |
|---|---|---|---|
| Bootstrap (PCA11 only) | 200 | 1.31 | 0.67 |
| Bootstrap (PCA11 + NJF) | 200 | 0.90 | 0.65 |
| SMPL (PCA11) | 3000 | 1.72 | 0.62 |
| STAR (PCA11) | 15000 | 2.15 | 0.58 |
| GHUM-VAE | 64000 | 5.89 | 2.63 |
| GHUM-PCA | 64000 | 6.74 | 3.01 |

FIG. 4

| Space | Bootstrap | GHUM | STAR | SMPL |
|---|---|---|---|---|
| Bootstrap | (4.10) | 3.57 | 1.38 | 1.46 |
| GHUM | 4.03 | (4.48) | 3.65 | 3.71 |
| STAR | 1.79 | 3.74 | (3.96) | 1.37 |
| SMPL | 1.90 | 3.75 | 1.36 | (4.14) |

FIG. 5

SHAPE SPACE GENERATION VIA PROGRESSIVE CORRESPONDENCE ESTIMATION

TECHNICAL FIELD

This disclosure relates generally to virtual reality or augmented reality. More specifically, but not by way of limitation, this disclosure relates to generating a shape space via progressive correspondence estimation.

BACKGROUND

Morphable models, especially for human bodies, are a backbone for many human-centric workflows as they provide a simple yet expressive shape space. Such shape space has been extensively used for a variety of applications, for example retexturing, shape editing, pose and illumination manipulation, animation, avatar creation, etc. Creating such morphable models usually requires many scans of different subjects with a wide coverage of body shape and pose variations. Rapid advances in affordable, portable, and robust three-dimensional (3D) scanning hardware, for example, red, green, blue-depth (RGB-D) sensors, range scanners, have made access to raw scans easier and faster. However, it is challenging to establish dense correspondences among raw scans that capture sufficient shape variation. The most common approach is to use non-rigid registration to align scans with a template body mesh. This works well when the input shapes have limited variations and are clean. Unfortunately, when shape variability is large or contains holes and noise, manual intervention or strong shape priors are needed for successful registration. Thus, users have to either annotate landmark correspondence across the scans or provide shape priors to regularize the registration step. Manual annotation is expensive, time-consuming, and does not scale easily. Providing a shape prior is tricky as it requires shapes in correspondence to generate in the first place.

SUMMARY

Certain embodiments involve generating a shape space via progressive correspondence estimation. In one example, a computing system accesses a set of registered three-dimensional (3D) digital shapes. The set of registered 3D digital shapes are registered to a shape template. The computing system determines a linear model for an estimate of the shape space using a first subset of the set of registered 3D digital shapes. The computing system then trains a nonlinear deformation model for the shape space using a second subset of the set of registered 3D digital shapes to create a trained nonlinear deformation model. An unregistered shape can be projected to the shape space using the linear model to create an initial registration for the unregistered shape. An updated registration can be predicted based on the initial registration using the trained nonlinear deformation model. The updated registration can be added to the set of registered 3D digital shapes to update the estimate of the shape space if a shape distance between the updated registration and the unregistered shape is below a threshold value.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 3 depicts an example of a comparison between bootstrapping shape spaces using the bootstrapping method according to certain embodiments of the present disclosure and baseline shape spaces using some baseline methods.

FIG. 4 depicts an example of a comparison between the bootstrapped shape spaces generated and some existing shape spaces, according to certain embodiments of the present disclosure.

FIG. 5 depicts an example of a comparison between the diversity of the bootstrapped shape space and the diversity of some existing shape spaces, according to certain embodiments of the present disclosure.

DETAILED DESCRIPTION

Figure 1:
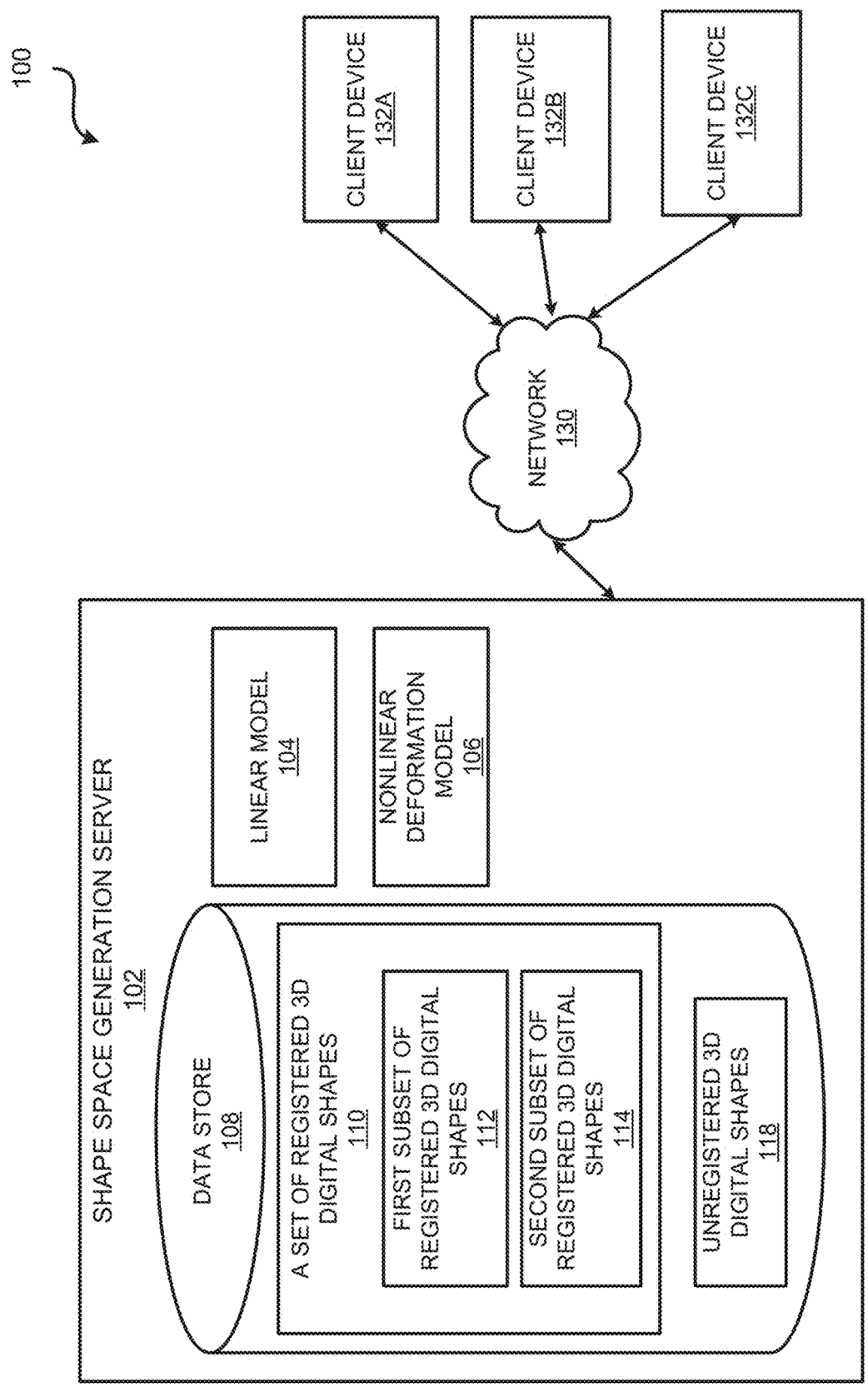
FIG. 1 depicts an example of a computing environment in which a shape space generation server generates a shape space via progress correspondence estimation.

Certain embodiments involve generating a shape space via progressive correspondence estimation. For instance, a computing system accesses a set of registered three-dimensional (3D) digital shapes. One subset of the set of registered 3D digital shapes can be used to determine a linear model for the shape space, and another subset of the set of registered 3D digital shapes can be used to train a nonlinear deformation model for the shape space. A shape space is a multi-dimensional space in which each point is an abstract representation of a specific shape. The linear model and the nonlinear deformation model can be used to register unregistered shapes to enhance the shape space. An unregistered shape is first projected to an estimate of the shape space based on the linear model to create an initial registration for the unregistered shape, that is, establishing a correspondence between the unregistered shape and a shape template of the shape space. An updated registration is then predicted based on the initial registration using the trained nonlinear deformation model. If a shape distance between the updated registration and the unregistered shape is below a threshold value, the updated registration is added to the set of registered 3D digital shapes which is used to further improve the estimation of the shape space. With more unregistered shapes progressively being registered and added to the set of registered 3D digital shapes, the estimation of the shape space is improved.

The following non-limiting example is provided to introduce certain embodiments. A shape space generation server can access a set of registered 3D digital shapes. The set of registered 3D digital shapes are registered to a shape template (e.g., a Skinned Multi-Person Linear model (SMPL) template or any other suitable shape template). In other words, correspondence is established between the set of 3D digital shapes and the shape template, or the set of 3D digital shapes align to or match the shape template. In some examples, the set of 3D digital shapes are aligned to the shape template in the canonical pose (e.g., T pose) via a manual non-rigid registration process to avoid any registration artifact.

The shape space generation server can determine a linear model (e.g., a principal component analysis (PCA)-based model) for a shape space using a first subset of the set of registered 3D digital shapes. The shape space generation server can also train a nonlinear deformation model (e.g., Neural Jacobian Fields (NJF)-based model) for the shape space using a second subset of the set of registered 3D digital shapes.

For an unregistered shape, the shape space generation server projects it to the shape space by using the linear model to create an initial registration for the unregistered shape. In some examples, the shape space generation server optimizes pose parameters and shape coefficients by identifying a shape in the first subset of the set of registered 3D digital shapes that best matches the unregistered shape. The initial registration for the unregistered shape can be created based on the optimized shape coefficients using the linear model. The initial registration may not accurately represent the unregistered shape due to the limited expressivity of the linear model. The shape space generation server then uses the trained nonlinear deformation model to predict an updated registration based on the initial registration. The nonlinear deformation model deforms and enriches the initial registration to include more details from the unregistered shape, for example using the optimized pose parameters obtained above.

The shape space generation server then calculates a shape distance (e.g., a Chamfer Distance) between the updated registration and the unregistered shape. If the shape distance is below a threshold value (e.g., one standard deviation of the minimum distance (or error) between the unregistered shape and the first subset of the set of registered 3D digital shapes), the updated registration is added to the set of registered 3D digital shapes to enhance the shape space. In some examples, the updated registration is added to the first subset of the set of registered 3D digital shapes to create an updated first subset of registered 3D digital shapes. The updated first subset of registered 3D digital shapes can be used to update the linear model and the initial state for training nonlinear deformation model. The updated linear model and the retrained the nonlinear deformation model can be used to align another unregistered shape to the shape template for registration as described above. In this way, the estimation of the shape space can be refined by using more registered shapes. The refined shape space can be used for a variety of applications, including retexturing, shape editing, pose and illumination manipulation, animation, avatar creation, by accurately predicting a given raw scan's shape parameters despite the noise in the raw scan.

Certain embodiments of the present disclosure overcome the disadvantages of the prior art, by generating a shape space progressive correspondence estimation. The proposed process uses a small set of manually registered scans and a much larger set of unregistered scans to generate and enhance a shape space by progressively aligning the unregistered scans with a shape template. Thus, the user does not need to manually register thousands of raw scans. Especially, a nonlinear deformation model is used to capture details missed by a linear model of the shape space, by deforming certain poses or shapes in the shape template, allowing progressive enrichment of the shape space. The user does not need to rely on manual intervention when the shape variability is large, or the raw scans contain holes or noise. The shape space generated in the present disclosure is at par with state-of-the-art shape spaces that require thousands of scans to be registered manually. Overall, the proposed process avoids manual intervention and reduces the time to learn a shape space with comparable performance.

Referring now to the drawings, FIG. 1 depicts an example of a computing environment 100 in which a shape space generation server 102 generates a shape space via progress correspondence estimation. In various embodiments, the computing environment 100 includes a shape space generation server 102 connected with client devices 132A, 132B, and 132C (which may be referred to herein individually as a client device 132 or collectively as the client devices 132) via the network 130. The network 130 may be a local-area network ("LAN"), a wide-area network ("WAN"), the Internet, or any other networking topology known in the art that connects the client devices 132 to the shape space generation server 102. The shape space generation server 102 is configured to generate a shape space via progressive correspondence estimation.

The shape space generation server 102 includes a data store 108. The data store 108 stores a set of registered 3D digital shapes 110, which can be divided into a first subset 112 and a second subset 114, which can be used to generate a linear model and a nonlinear deformation model for a shape space, respectively, as described below. The data store 108 can also store a set of unregistered 3D digital shapes 118 to be registered and added to the set of registered 3D digital shapes 110 as described below.

The shape space generation server 102 is configured to learn a shape space that captures the variation of plausible body shapes based on registered 3D digital shapes. To do so, the shape space generation server 102 converts the set of unregistered 3D digital shapes 118, for example raw scans of varied human body shapes, into registered 3D digital shapes based on a predefined shape template topology. The shape space generation server 102 also has access to the set of registered 3D digital shapes 110. The set of registered 3D digital shapes have been brought to correspondence (e.g., registered) with the same shape template topology manually. Initially, the set of registered 3D digital shapes can be a small set, for example, including about 500 registered 3D digital shapes. In comparison, the set of unregistered 3D digital shapes can be a larger set, for example, including about 3500 unregistered 3D digital shapes. The shape space generation server 102 is configured to expand the set of registered 3D digital shapes by adding registrations for some or all of the unregistered 3D digital shapes.

The shape space generation server 102 is configured to determine a linear model 104 representing the initial shape space using a first subset 112 of the set of registered 3D digital shapes 110. The shape space generation server 102 is also configured to train a nonlinear deformation model 106 for the shape space using a second subset 114 of the set of registered 3D digital shapes 110.

The shape space generation server 102 is configured to iteratively expand the set of registered 3D digital shapes 110 with new registered shapes for the unregistered 3D digital shapes 118 that can be automatically brought into correspondence with the shape template. In turn, the shape space generation server 102 learns and enhances the shape space by updating the linear model 104 and the nonlinear deformation model 106 based on the expanded set of registered 3D digital shapes. For example, the shape space generation server 102 fits the shape template to an unregistered 3D digital shape to create an initial registration for the unregistered 3D digital shape. In other words, the shape space generation server 102 can project the unregistered 3D digital shape to the initial shape space represented by the linear model 104 to obtain a canonical pose for the unregistered 3D digital shape. The initial registration may not accurately represent the unregistered shape due to the limited expressivity of the linear model. The shape space generation server 102 can then pose the initial registration for the unregistered shape to match the pose of the unregistered 3D digital shape using the nonlinear deformation model 106. The shape template can be a mesh with N vertices. The nonlinear deformation model can assign new 3D positions to the vertices of the template mesh. The nonlinear deformation model deforms and enriches the initial registration to include more details from the unregistered shape.

The shape space generation server 102 is also configured to calculate a shape distance between the updated registration and the unregistered shape. If the shape distance is below a threshold value (e.g., one standard deviation of the minimum distance from the unregistered shape to the first subset 112 of registered 3D digital shapes), the updated registration is added to the set of registered 3D digital shapes 110 to enhance the shape space. In some examples, the updated registration is added to the first subset 112 of registered 3D digital shapes 110, which in turn can be used to update the linear model 104 and the initial state for training the nonlinear deformation model 106. The updated linear model and the retrained nonlinear deformation model can be used to align another unregistered shape to the shape template for registration as described above. This way, the shape space generation server 102 learns the shape space by adding more registered shapes.

The shape space generation server 102 updates an estimate of a shape space by expanding the set of registered 3D digital shapes for a predefined number of iterations or a predetermined period of time for iterations. A client device 132 can edit, manipulate, animate, or create a new shape using the estimate of the space shape generated in the shape space generation server 102.

Figure 2:
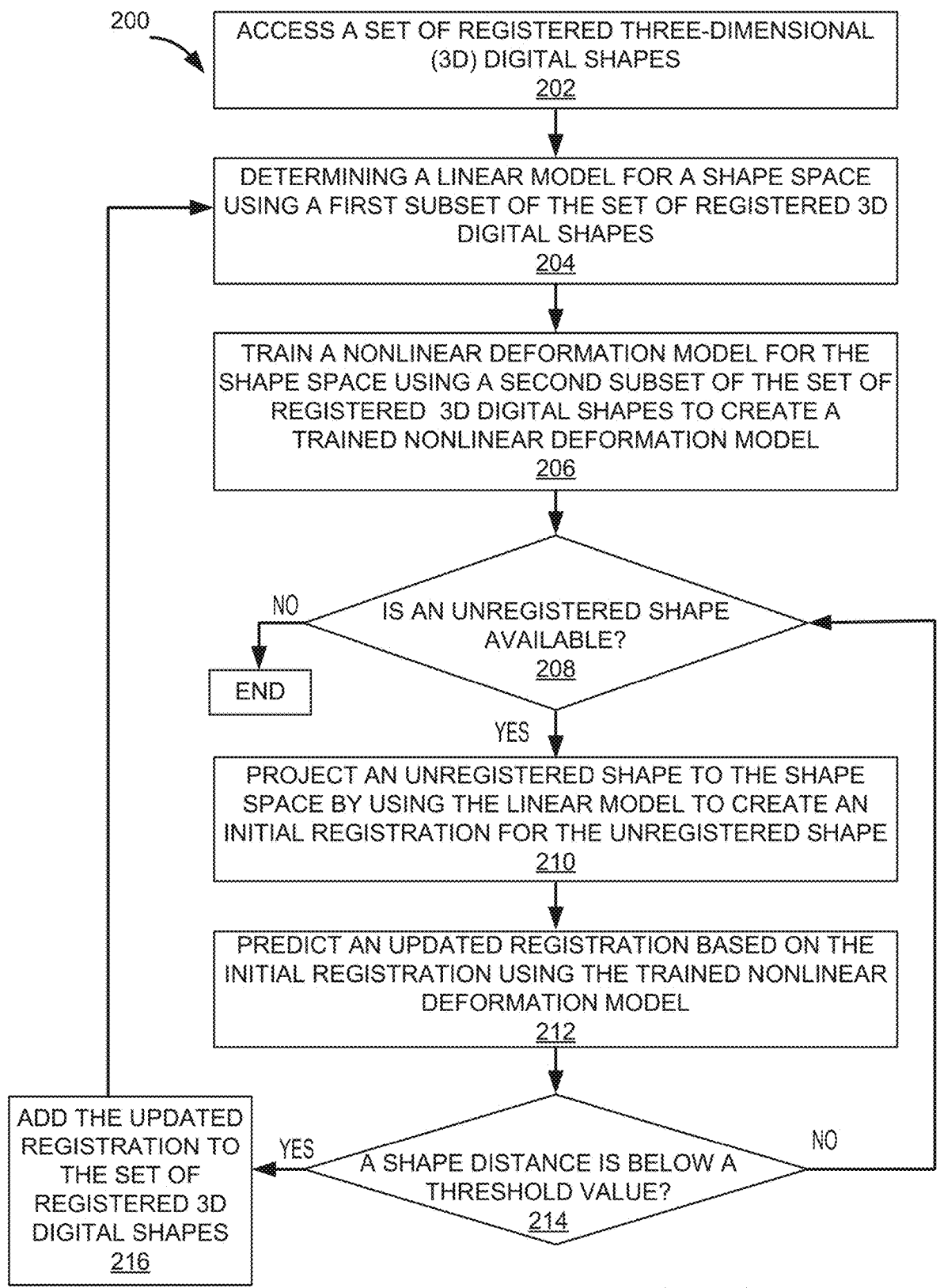
FIG. 2 depicts an example of a process for generating a shape space via progressive correspondence estimation, according to certain embodiments of the present disclosure.

FIG. 2 depicts an example of a process 200 for generating a shape space via progressive correspondence estimation, according to certain embodiments of the present disclosure. At block 202, a shape space generation server 102 accesses a set of registered three-dimensional (3D) digital shapes 110. The set of registered 3D digital shapes 110 initially includes multiple registered 3D digital shapes that are registered to a shape template. The shape template can be a SMPL template or any other suitable shape template. Registering a shape typically consists of two steps: the first step is to estimate correspondence between the source shape and the target shape (e.g., the shape template); and the second step is to minimize the distance between each correspondence pair to bring the source shape closer to the target shape. In some examples, the multiple registered 3D digital shapes in the set of registered 3D digital shapes are for human body scans. Since human bodies often deform non-rigidly, the human body scans can be brought to the shape template in the canonical pose via a manual non-rigid registration process to avoid any registration artifacts.

At block 204, the shape space generation server 102 determines a linear model 104 for a shape space using a first subset 112 of the set of registered 3D digital shapes 110. The linear model is an estimate of the shape space. The shape space can be composed of a pose-corrective deformation basis allowing for pose-conditioned deformations and a shape basis that enables body-shape deformations. In some examples, the shape space generation server 102 borrows the pose correctives directly from the shape template and focuses on learning a space of body shapes. In some examples, the linear model 104 is a principal component analysis (PCA)-based model, which is represented by K basis eigenvectors. The number K can be determined such that the shape variation in the first subset 112 of registered 3D digital shapes 110 can be explained using the K basis vectors. The higher the number of basis eigenvectors is (e.g., the more the number of PCA components are considered), the more expressive the corresponding PCA-based model is. Meanwhile, it takes more computing power and longer processing time to build the PCA model and project an unregistered shape to the PCA model. When the number of basis eigenvectors increase to a certain point, the expressivity of the PCA model has little change. In some examples, 11 basis eigenvectors are used for PCA-based models, which can sufficiently represent a linear model of the shape space. Functions included in block 204 can be used to implement a step for determining a linear model for a shape space using a first subset of the set of registered 3D digital shapes.

At block 206, the shape space generation server 102 trains a nonlinear deformation model 106 for the shape space using a second subset 114 of the set of registered 3D digital shapes 110 to create a trained nonlinear deformation model. In some examples, the nonlinear deformation model is a Neural Jacobian Fields (NJF)-based model. The NJF-based model includes a multi-layer perceptron (MLP), which can process the input features on each triangle of a given mesh to produce a per-triangle Jacobian. The per-triangle Jacobian can be used in a differentiable Poisson solve to compute the deformed vertex positions. The NJF-based model can be used to deform the PCA projection conditioned on the raw scan.

For a raw scan $S_X$ corresponding to a registered 3D digital shape X in the second subset of the registered 3D digital shapes, Equations (1)-(3) can be implemented to obtain optimized shape parameters and an initial registration (or projection to the PCA-based shape space). With the PCA-based model determined at block 204, the raw scan $S_X$ in any particular pose $\theta$ can be defined as in Equation (1) below, where $\overline{S}$ is the mean shape, $\{v_{s_i}\}$ are eigenvectors representing the PCA-based model, $\{a_i\}$ are shape coefficients, and $B_p(\theta)$ is the pose corrective directly from the SMPL template.

$$S_X(\{a_i\}, \theta) := \overline{S} + \sum_{i=1}^{k} a_i v_{s_i} + B_p(\theta) \tag{1}$$

The projection of the raw scan $S_X$ to the PCA-based shape space can be represented by Equation (2) below, where $\mathcal{J}$ is the joint regressor that provides the joint locations given the vertex positions in the shape, $W_s$ is a fixed set of skinning weights, and W is the skinning function defined in the SMPL template.

$$S_{pX}(\{a_i\}, \theta) := \mathcal{W}(S_X(\{a_i\}, \theta), \mathcal{J}, \theta, W_s) \tag{2}$$

Given a target scan $S_X$ and a current set of shape basis vectors $\{v_{s_i}\}$, the pose parameters and the shape coefficients can be optimized using Equation (3) below, where $D_{CD}$ is the Chamfer Distance and $S_U$ is an unregistered raw scan.

$$g(S_X) := (\{a_i^*\}, \theta^*) \qquad (3)$$
$$= \mathrm{argmin} D_{CD}(\mathcal{W}(S_X, \mathcal{J}, \theta, W_s), S_X)$$

Equation (3) can be optimized to find the shape in the PCA-based model that best matches the raw scan $S_X$ while also optimizing for the pose parameters and the shape coefficients. This way, the raw scan $S_X$ is projected onto the shape space via the function g. After optimization, the canonical shape corresponding to a raw scan $S_X$ is obtained as $X_0 := \bar{S} + \Sigma_{i=1}^{k} a_i^* v_{s_i}$. This way, the initial registrations for the corresponding registered 3D digital shapes in the second subset are obtained.

The initial registrations and corresponding registered 3D digital shapes in the second subset are used to train the NJF to map the initial registrations to the registered 3D digital shapes, conditioned on the corresponding raw scan that can be in any pose. Essentially, the deformation model f is trained to deform the result of the initial registration (or the shape space projection) to an updated registration (e.g., a target registration) that contains richer details. The deformation model f is conditioned on the raw scan corresponding to the target registration and is capable of fixing any residues not covered by the optimization in Equation (3). The deformation is trained by optimizing two losses: first, the vertex-vertex loss $L_{vertex}$ between the updated registration and the ground truth shape (e.g., the raw scan) as defined in Equation (4); second, the per-triangle Jacobian loss $L_{vertex}$ between the updated registration Jacobian and the ground-truth Jacobian as defined in Equation (5). The total loss can be determined as Equation (6), where y represents learnable parameters.

$$L_{vertex} := \|f(X_o, S_X, \gamma) - X\|^2 \qquad (4)$$
$$L_{Jocabian} := \|J_f - J_X\|^2 \qquad (5)$$
$$L_{total} = 10 * L_{vertex} + L_{Jocabian} \qquad (6)$$

In some examples, the initial registration $X_0$ of the corresponding raw scan $S_X$ are not represented by vertex locations (e.g., vertex coordinates) as used above. Instead, the initial registration $X_0$ of the corresponding raw scan $S_X$ are represented as features, such as PointNet encodings of the vertex coordinates. As an example, for the raw scan $S_X$, both the global encoding of the raw scan and its per-point features from PointNet can be obtained. Since the raw scan and the initial registration are not in correspondence, features of those points that are closest to a point on the initial registration $X_0$ are selected. Despite the initial registration and the raw scan have different poses, the nearest neighbor feature look-up provides an indication to the MLP of the kind of shape transformation that is required. The PointNet encodings of the raw scan and the points of the raw scan are then associated to each triangle of the initial registration. The raw scan and the initial registration are processed via different PointNets as their input features are different. The PointNet encodings and the points of the raw scan can be input to a four-layer MLP, with each hidden layer being 128 wide and activated by a rectified linear unit (ReLU). The final Linear layer produces a nine-dimensional vector for reach triangle since a Jacobian is a 3×3 matrix. The PointNet for the raw scan, the PointNet for the initial registration, and the MLP are trained jointly to produce the mapping from the initial registration to an updated registration (e.g., a desired shape). Functions included in block 206 can be used to implement a step for obtaining a nonlinear deformation model for the shape space based on a second subset of the set of registered 3D digital shapes.

At block 208, the shape space generation server 102 determines if an unregistered shape is available. The shape space generation server 102 can process a set of unregistered 3D digital shapes 118 one by one to enhance the shape space by bringing some or all of the unregistered 3D digital shapes 118 to correspondence with the shape template. If an unregistered 3D digital shape is unavailable (e.g., all the unregistered 3D digital shapes are processed), the process ends. If an unregistered 3D digital shape is still available, the process proceeds to block 210.

At block 210, the shape space generation server 102 projects an unregistered shape to the shape space by using the linear model 104 to create an initial registration for the unregistered shape. With the PCA-based model determined at block 204, a new shape Sc in any particular pose θ can be defined as in Equation (7) below, similar to Equation (1), where $\bar{S}$ is the mean shape, $\{v_{s_i}\}$ are eigenvectors representing the PCA-based model, $\{a_i\}$ are shape coefficients, and $B_p(\theta)$ is the pose corrective directly from the SMPL template.

$$S_c(\{a_i\}, \theta) := \bar{S} + \sum_{i=1}^{k} a_i v_{s_i} + B_p(\theta) \qquad (7)$$

The projection $S_p$ of the new shape Sc to the PCA-based shape space can be represented by Equation (8) below, similar to Equation (2) above, where $\mathcal{J}$ is the joint regressor that provides the joint locations given the vertex positions in the shape, $W_s$ is a fixed set of skinning weights, and $\mathcal{W}$ is the skinning function defined in the SMPL template.

$$S_p(\{a_i\}, \theta) := \mathcal{W}(S_c(\{a_i\}, \theta), \mathcal{J}, \theta, W_s) \qquad (8)$$

Given a target scan $S_U$ and a current set of shape basis vectors $\{v_{s_i}\}$, the pose parameters and the shape coefficients can be optimized using Equation (9) below, similar to Equation (3), where $D_{CD}$ is the Chamfer Distance and $S_U$ is an unregistered raw scan.

$$g(S_U) := (\{a_i^*\}, \theta^*) \qquad (9)$$
$$= \mathrm{argmin} D_{CD}(\mathcal{W}(S_c, \mathcal{J}, \theta, W_s), S_U)$$

Equation (9) can be optimized to find the shape in the PCA-based model that best matches the scan $S_U$ while also optimizing for the pose parameters and the shape coefficients. This way, the raw scan is projected onto the shape space via the function g. After optimization, the canonical shape corresponding to a raw scan is obtained as $X_{uo} := \bar{S} + \Sigma_{i=1}^{k} a_i^* v_{s_i}$. Due to the limited expressivity of the linear basis, $X_{uo}$ may not accurately represent $S_U$. A deformation model may be used to further enrich $X_{uo}$ with the details from $S_U$.

At block 212, the shape space generation server 102 predicts an updated registration based on the initial registration using the trained nonlinear deformation model. The trained nonlinear deformation model f obtained at block 206 can be used to predict the updated registration for the unregistered 3D digital shape. The updated registration $X_U$ is posed to match the pose of the raw scan by using the optimized pose parameter $\theta^*$ obtained in Equation (9). The updated registration can include more details about the unregistered 3D digital shape, compared to the initial registration.

At block 214, the shape space generation server 102 determines if a shape distance between the updated registration and the corresponding unregistered 3D digital shape is below a threshold value. In some examples, the shape distance is a Chamfer Distance. The threshold value can be one standard deviation from the minimum distance from the unregistered shape to the first subset of registered 3D digital shapes. If the Chamfer Distance between the updated registration and the unregistered 3D digital shape is below the threshold value, the process proceeds to block 216 to add the updated registration to the set of registered 3D digital shapes 110. If the Chamfer Distance is equal to or greater than the threshold value, the updated registration is not added to the set of registered 3D digital shapes 110 and the process proceeds to block 208 for processing the next available unregistered 3D digital shape.

At block 216, the shape space generation server 102 adds the updated registration to the set of registered 3D digital shapes. The set of registered 3D digital shapes is expanded by adding the updated registration for the unregistered 3D digital shapes. In some examples, the updated registration for the unregistered 3D digital shapes is added to the first subset 112 for determining the linear model 104. In the next iteration, the linear model 104, which is an estimate of the shape space, is updated by computing updated PCA components with the expanded first subset of registered 3D digital shapes. The updated PCA components also provides new initial state for training the deformation model as described at block 206. The updated linear model and the retrained the nonlinear deformation model are used to register the next available unregistered 3D digital shapes. This way, the steps of constructing a linear model, training a nonlinear deformation model, and registering new scans, for example as illustrated by blocks 204-216, can be repeated to enhance the shape space. The shape space is progressively improved, in other words, becomes more expressive with each iteration. The process 200 ends when the available unregistered 3D digital shapes are processed, after a certain period of time, or by any other suitable criteria.

In general, a 3D morphable model, which can model 3D human shapes, can adapt a shape template to each person by controlling the shape variations in a low-dimensional space. Learning such a parametric shape space often requires a large database of body scans and bring them into correspondence by registering a common template mesh to them. Most models in the prior art are trained with thousands or tens of thousands of registrations to body scans, curated with manual intervention for quality control. However, the process 200 in the present disclosure may use only 200 or so registered shapes for initial training. Moreover, the database of body scans often has each subject scanned in similar but not exactly the same pose (e.g., A-pose) while the template is desired to be in one canonical pose (e.g., a T-pose). To factor out the pose variation in the data, most models perform an un-posing process to bring registration to the canonical pose. Any artifact introduced in this step are kept in the learned shape space. However, the process in the present disclosure takes can take A-posed scans as input and output the canonical shapes in T-pose, requiring no un-posing before including them to training.

Certain registration methods exist to register raw scans to a shape space. When the source shape and the target shape are roughly aligned in the ambient 3D space, correspondences can be approximated by alternating between seeking nearest points and deforming the target points. These methods can be non-rigid variants of the classical Iterative-Closest-Point (ICP) algorithm. For fast convergence, such methods assume the two sets of points to be close enough or require a guess to initialize the correspondence. Furthermore, these methods often require additional regularization terms to avoid local minima, e.g., Laplacian and as-rigid-as-possible (ARAP). They impose extrinsic heuristics to constrain the deformation, which do not always apply to the target tasks. In contrast, the nonlinear deformation model (e.g., NJF model) implemented in the present disclosure implicitly learns an appropriate regularization in a data-driven manner. The NJF model can also better distribute error by having a global Poisson solve to integrate local gradient (e.g., Jacobian) information.

Global registration methods are another type of existing registration methods, which match two human shapes without assuming they are close in 3D shapes. Instead of matching points in 3D shape, the global registration methods measure the similarity in a predefined feature space and leverage machine-learning techniques to estimate correspondence, optionally refined with a global optimization. The quality of these methods degrades significantly when the shapes are outside the distribution of the training data. more importantly, such methods do not yet handle noise in raw scans, and hence cannot be easily used in those settings as the registration process in the present disclosure.

As an example, the scans from the Civilian American and European Surface Anthropometry Resource (CAESAR) dataset can be used for learning a shape space based on process 200. A number of scans (e.g., 429 or a similar number) from the CAESAR dataset can be registered manually by a professional artist. The professional artist took 40 to 60 minutes per scan using a combination of landmark point specification, running nonrigid ICP, and then manually fine-tuning dense correspondence correction/specification (e.g., around fingers, armpit, etc.). These artist-registered meshes are considered as Ground Truth for evaluation and training, and as targets in the case of some baselines. Part of the artist-registered meshes (e.g., 100 out of the 429 artist-registered scans) can used as the first subset 112 for determining a linear model for the shape space. Part of the artist-registered meshes (e.g., another 100 out of the 429 artist-registered scans) can be used as the second subset 114 for training a nonlinear deformation model. The process 200 uses a small set of registered shapes to iteratively register unregistered shapes to enhance the shape space. The first subset and the second subset can be mutually exclusive or not. Since the original CAESAR dataset consists of around 4000 scans, about 429 of which are artist-registered, the rest of the scans (e.g., about 3500) can be considered as unregistered 3D digital shapes 118, some or all of which can be brought to correspondence with the shape template of the shape space. The linear model can be a PCA-based model, for example with 11 basis eigenvectors. Despite the second subset for training the nonlinear deformation model is fixed, since the basis of the shape space changes, the initial registration changes, consequently, the amount of details that the nonlinear deformation model needs to compensate also changes. The process 200 for generating or learning a shape space in the present disclosure can be referred to as a bootstrapping process, and the learned shape space can be referred to as a bootstrapped shape space.

The bootstrapped shape space by the process 200 can be evaluated in comparison to some shape spaces learned by some baseline methods and existing shape spaces. For example, the vertex-to-vertex (v2v) distance (or error) between the ground truth shape and the registered shapes in the shape space learned by the process 200 and other shape spaces generated by certain baseline methods can be measured, using the artist-annotated scan-to-template correspondences. similarly, the vertex-to-plane (v2p) distance is also measured.

FIG. 3 depicts an example of a comparison 300 between bootstrapped shape spaces using the bootstrapping method according to certain embodiments of the present disclosure and baseline shape spaces using some baseline methods. Baseline 1 method uses a PCA model generated with 400 registered shapes and an NJF model trained with the same 400 registered shapes to add the missing details not covered by the PCA model. Baseline 1 methods represents the scenario where one trains the model in one go with all available registrations, without any bootstrapping schemes that leverage the unregistered scans. Hence, this can be seen as an upper bound. FIG. 3 shows that the shape space generated using the baseline 1 method attains the lowest v2v error of 0.87 cm on a smaller evaluation set of 29 registered scans.

For baseline 2 and baseline 3, the PCA model is generated with 100 registered scans, and the NJF model is replaced with classical non-rigid registration methods. Given an unregistered scan, the projection to the PCA space is first obtained, then the location of each vertex on the projection is optimized. So that when posed with an optimized pose parameter, the registered shape yields low Chamfer Distance to the unregistered scan. Since this free-form deformation scheme can fall into local minimum easily, standard regularization terms can be added to further define baseline 2 and baseline 3. For baseline 2, the regulation term is that vertices should not be deviating too far from the canonical shapes (e.g., projection to the linear model). In other words, the deviation should be small favoring smooth surfaces. For baseline 3, the regularization term is that the deformation should preserve edge length. In other words, baseline 3 favors near-isometric deformations. Both baseline 2 and baseline 3 methods process 800 unregistered scans to improve their corresponding shape spaces. The baseline shape space by the baseline 2 method yields a v2v error of 3.11 cm on an evaluation set of 229 registered shapes. The baseline 3 method yields a v2v error of 3.26 cm on an evaluation set of 229 registered shapes.

The bootstrapping method in the present disclosure builds a shape space with 100 registered scans for generating a linear model and 100 registered scans for training a nonlinear deformation model initially, and then enhances the shape space by processing 800 unregistered shapes, as shown in FIG. 3. The bootstrapping method can attain a v2v error of 0.90 on an evaluation set of 229 registered shapes. The v2v error by the bootstrapping method in the present disclosure is on par with the upper bound created by the baseline 1 method, which is 0.87 in this example. Thus, it shows that the bootstrapping method in the present disclosure can build a shape space with fewer registered shapes to start with and progressively improves the shape space by iteratively consuming unregistered shapes to eventually obtain a comparable result as the baseline shape space generated by the baseline 1 method.

If the bootstrapping method only uses the linear model, which is a PCA model represented by 11 basis eigenvectors, without using the nonlinear deformation model (e.g., NJF model), the bootstrapping method can attain a v2v error of 1.31 cm on an evaluation set of 229 registered shapes. The nonlinear deformation model in the present disclosure reduces the v2v error, thus further enriches the shape space. By consuming the same number of unregistered scans, shape spaces enriched by non-rigid registration as in baseline 2 and baseline 3 methods yield v2v errors of 3.11 cm and 3.26 cm respectively. This suggests that using a data-driven nonlinear deformation model (e.g., NJF model) as in the present disclosure recovers better correspondence than using non-rigid registration methods (e.g., optimization-based ICP). When the non-linear deformation model is combined with the linear model, it leads to an enhanced shape space with richer information.

FIG. 4 depicts an example of a comparison 400 between the bootstrapped shape spaces and some existing shape spaces, according to certain embodiments of the present disclosure. In FIG. 4, the shape spaces generated by the bootstrapping method in the present disclosure are compared with some existing shape spaces, SMPL, Sparse Trained Articulated Regressor (STAR), and Generative 3D Human Shape and Articulated Pose Model (GHUM). The classical SMPL shape space is trained with the registrations of 3800 CAESAR scans. The STAR shape space uses 15000 registrations totally for the SizeUSA dataset and the original CAESAR scans. The GHUM shape space includes 64000 registrations for a proprietary dataset of scans, where a majority consists of body, hand, and facial pose variations, along with the original CAESAR scans. GHUM presents both a variational auto-encoder (VAE)-based nonlinear shape space as well as a linear shape space, both of which are included in FIG. 4. Only 11 PCA basis eigenvectors are used in the SMPL, STAR, and the bootstrapped shape spaces in the present disclosure, while all the PCA components are used for GHUM linear shape space.

For each registered scan in the evaluation set, the pose and shape parameters of the corresponding unregistered scan are optimized. Both the v2v error and the v2p error are included in FIG. 4. The shape space created by the bootstrapping method in the present disclosure attains the lowest v2v error of 0.90 cm, which includes a nonlinear deformation model. If the shape space only includes the linear model without the nonlinear model, the v2v error is 1.31 cm, which is still lower than those of the existing shape spaces. The lowest v2p error of 0.58 cm is attained by the STAR shape space. However, the shape spaces created by the bootstrapping method of the present disclosure have comparable v2p errors, which are 0.67 cm without the nonlinear deformation model and 0.65 cm with the nonlinear deformation model. Thus, it can be concluded that despite starting with only a small amount of registrations, the bootstrapped shape spaces of the present disclosure yields on-par expressivity compared to a model trained with an order of magnitude more registrations. This is due to the novel combination of a linear (e.g., PCA) model and a non-linear (e.g., NJF) deformation model, as well as the progressive scheme leveraging such a hybrid deformation model for better correspondence.

FIG. 5 depicts an example of a comparison 500 between the diversity of the bootstrapped shape space and the diversity of some existing shape spaces, according to certain embodiments of the present disclosure. In FIG. 5, about 500 body shapes are sampled from each shape space by furthest point sampling. For each sampled body shape, the nearest sample within the same shape space is computed by measuring the v2v error. Such pairwise sample distances are shown in the paratheses in FIG. 5. They are 4.10 for the bootstrapped shape space, 4.48 cm for the GHUM shape space, 3.96 cm for the STAR shape space, and 4.14 cm for the SMPL shape space. The higher pairwise distance means a more diverse shape space. As shown in FIG. 5, the diversity of the bootstrapped shape space is on par with existing shape spaces.

For each sample in one body shape space, its nearest samples in all other shape spaces are also computed. For each shape space in each row, the pairwise sample distance with respect to each shape space in each column is computed. For spaces A and B, low values for (A, B) and (B, A) indicate that the spaces are similar. For example, the pairwise sample distance between the bootstrapped shape space and the STAR shape space is 1.79 cm, and the pairwise sample distance between the STAR shape space and the bootstrapped shape space is 1.38 cm. Similarly, the pairwise sample distance between the bootstrapped shape space and the SMPL shape space and vice versa are 1.90 cm and 1.46 cm respectively. These distances are smaller than the pairwise distances between the bootstrapped shape space and the GHUM shape space (e.g., 4.03 cm, or 3.57 cm). It can be seen the bootstrapped shape space in the present disclosure is closer to SMPL and STAR.

Figure 6:
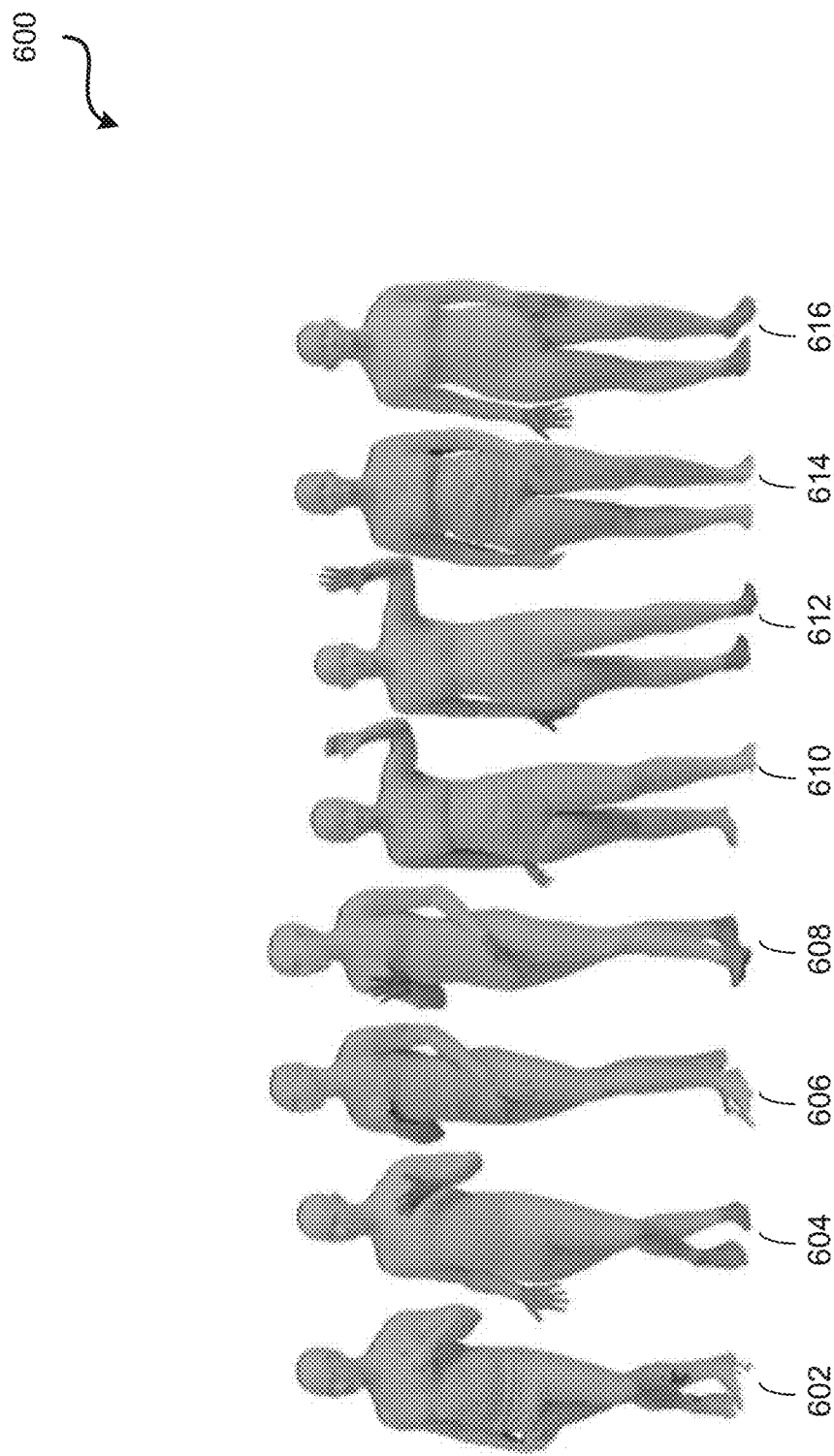
FIG. 6 depicts an example of registrations of noisy scans with the bootstrapped shape space, according to certain embodiments of the present disclosure.

FIG. 6 depicts an example of registrations 600 of noisy scans with the bootstrapped shape space, according to certain embodiments of the present disclosure. A typical application of a body shape space is to predict a given raw scan's shape parameters. In FIG. 6, for each raw scan 602, 606, 610, or 614, the shape parameters are estimated using the bootstrapped shape space for registration. The corresponding registrations for the raw scans are 604, 608, 612, and 616, which shows that the bootstrapped shape space accurately estimates the body shape despite the scans being noisy.

Figure 7:
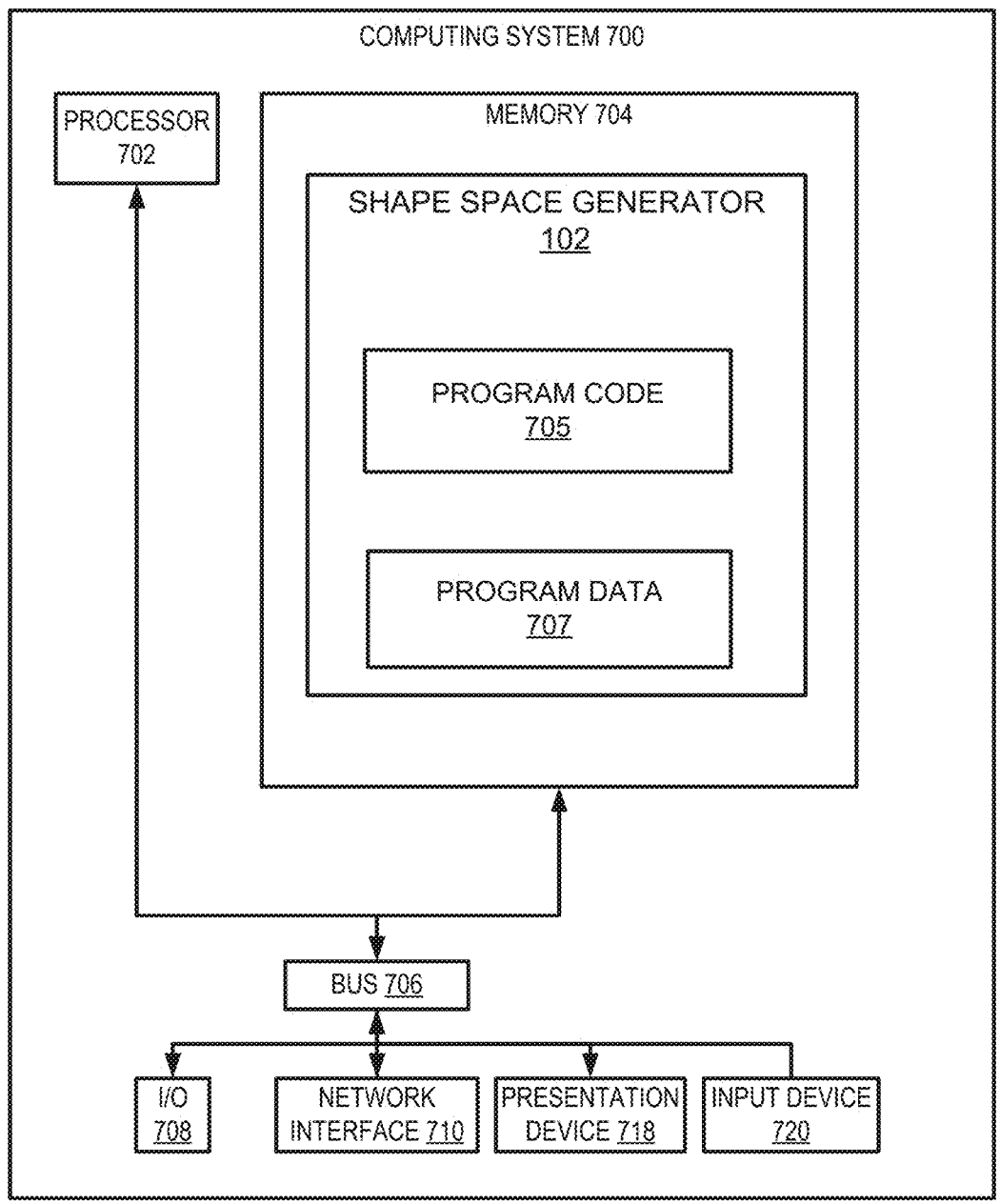
FIG. 7 depicts an example of a computing system for implementing certain embodiments of the present disclosure.

Any suitable computing system or group of computing systems can be used for performing the operations described herein. For example, FIG. 7 depicts an example of the computing system 700 for implementing certain embodiments of the present disclosure. The implementation of computing system 700 could be used to implement the shape space generation server 102. In other embodiments, a single computing system 700 having devices similar to those depicted in FIG. 7 (e.g., a processor, a memory, etc.) combines the one or more operations depicted as separate systems in FIG. 1.

The depicted example of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

A memory device 704 includes any suitable non-transitory computer-readable medium for storing program code 705, program data 707, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 executes program code 705 that configures the processor 702 to perform one or more of the operations described herein. Examples of the program code 705 include, in various embodiments, the application executed by the shape space generation server 102, or other suitable applications that perform one or more operations described herein. The program code may be resident in the memory device 704 or any suitable computer-readable medium and may be executed by the processor 702 or any other suitable processor.

In some embodiments, one or more memory devices 704 stores program data 707 that includes one or more datasets and models described herein. Examples of these datasets include extracted images, feature vectors, aesthetic scores, processed object images, etc. In some embodiments, one or more of data sets, models, and functions are stored in the same memory device (e.g., one of the memory devices 704). In additional or alternative embodiments, one or more of the programs, data sets, models, and functions described herein are stored in different memory devices 704 accessible via a data network. One or more buses 706 are also included in the computing system 700. The buses 706 communicatively couples one or more components of a respective one of the computing system 700.

In some embodiments, the computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and/or the like. The computing system 700 is able to communicate with one or more other computing devices (e.g., client device 132) via a data network using the network interface device 710.

The computing system 700 may also include a number of external or internal devices, an input device 720, a presentation device 718, or other input or output devices. For example, the computing system 700 is shown with one or more input/output ("I/O") interfaces 708. An I/O interface 708 can receive input from input devices or provide output to output devices. An input device 720 can include any device or group of devices suitable for receiving visual, auditory, or other suitable input that controls or affects the operations of the processor 702. Non-limiting examples of the input device 720 include a touchscreen, a mouse, a keyboard, a microphone, a separate mobile computing device, etc. A presentation device 718 can include any device or group of devices suitable for providing visual, auditory, or other suitable sensory output. Non-limiting examples of the presentation device 718 include a touchscreen, a monitor, a speaker, a separate mobile computing device, etc.

Although FIG. 7 depicts the input device 720 and the presentation device 718 as being local to the computing device that executes the shape space generation server 102, other implementations are possible. For instance, in some embodiments, one or more of the input device 720 and the presentation device 718 can include a remote client-computing device that communicates with the computing system 700 via the network interface device 710 using one or more data networks described herein.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

That which is claimed is:

1. A method performed by one or more processing devices, comprising:
   accessing a set of registered three-dimensional (3D) digital shapes, wherein the set of registered 3D digital shapes are registered to a shape template;
   determining a linear model for an estimate of a shape space using a first subset of the set of registered 3D digital shapes;
   determining a nonlinear deformation model for the shape space using a second subset of the set of registered 3D digital shapes;
   projecting an unregistered shape to the shape space by using the linear model to create an initial registration for the unregistered shape;
   predicting an updated registration based on the initial registration using the nonlinear deformation model; and
   adding the updated registration to the set of registered 3D digital shapes based on a shape distance between the updated registration and the unregistered shape being below a threshold value for updating the estimate of the shape space to create an updated estimate of the shape space, wherein the updated estimate of the shape space is usable for editing a 3D digital shape in the shape space.

2. The method of claim 1, wherein the shape template is a skinned multi-person linear model (SMPL)-based template, wherein the linear model is a principal component analysis (PCA)-based model, comprising multiple shape eigenvectors, and wherein the nonlinear deformation model is a Neural Jacobian Fields (NJF)-based model.

3. The method of claim 1, wherein an initial state of the nonlinear deformation model is determined based on the first subset of the set of registered 3D digital shapes.

4. The method of claim 1, wherein projecting the unregistered shape to the shape space by using the linear model to create an initial registration for the unregistered shape further comprises:
   determining a plurality of optimized pose parameters and a plurality of optimized shape coefficients for the unregistered shape; and
   creating the initial registration for the unregistered shape based on the plurality of optimized shape coefficients and the linear model.

5. The method of claim 4, wherein the updated registration is posed to match the unregistered shape based on the plurality of optimized pose parameters by using the nonlinear deformation model.

6. The method of claim 1, wherein the shape distance is a Chamfer Distance.

7. The method of claim 1, further comprising:
   adding the updated registration to the first subset of the set of registered 3D digital shapes to create an updated first subset of the set of registered 3D digital shapes;
   determining an updated linear model for the shape space using the updated first subset of the set of registered 3D digital shapes;
   updating the nonlinear deformation model for the shape space using the second subset of the set of registered 3D digital shapes to create an updated nonlinear deformation model;
   projecting a second unregistered shape to the shape space by using the updated linear model to create a second initial registration;
   predicting a second updated registration based on the second initial registration using the updated nonlinear deformation model;
   determining a second shape distance between the second updated registration and the second unregistered shape; and
   adding the second updated registration to the updated first subset of the set of registered 3D digital shapes based on a second shape distance between the second updated registration and the second unregistered shape being below the threshold value to create a further updated first set of registered 3D digital shapes and a further updated estimate of the shape space.

8. A system, comprising:
a memory component;
a processing device coupled to the memory component, the processing device to perform operations comprising:
   accessing a set of registered three-dimensional (3D) digital shapes, wherein the set of registered 3D digital shapes are registered to a shape template;
   determining a linear model for an estimate of a shape space using a first subset of the set of registered 3D digital shapes;
   determining a nonlinear deformation model for the shape space using a second subset of the set of registered 3D digital shapes;
   projecting an unregistered shape to the shape space by using the linear model to create an initial registration for the unregistered shape;
   predicting an updated registration based on the initial registration using the nonlinear deformation model; and
   adding the updated registration to the first subset of the set of registered 3D digital shapes based on a shape distance between the updated registration and the unregistered shape being below a threshold value to create an updated first subset of the set of registered 3D digital shapes for updating the estimate of the shape space to create an updated estimate of the shape space, wherein the updated estimate of the shape space is usable for editing a 3D digital shape in the shape space.

9. The system of claim 8, wherein the shape template is a skinned multi-person linear model (SMPL)-based template, wherein the linear model is a principal component analysis (PCA)-based model, comprising multiple shape eigenvectors, and wherein the nonlinear deformation model is a Neural Jacobian Fields (NJF)-based model.

10. The system of claim 8, wherein an initial state of the nonlinear deformation model is determined based on the first subset of the set of registered 3D digital shapes.

11. The system of claim 8, wherein projecting the unregistered shape to the shape space by using the linear model further comprises:
   determining a plurality of optimized pose parameters and a plurality of optimized shape coefficients for the unregistered shape; and
   identify a registered shape from the first subset of the set of registered 3D digital shapes best matching the unregistered shape based on the plurality of optimized shape coefficients.

12. The system of claim 11, wherein the updated registration is posed to match the unregistered shape based on the plurality of optimized pose parameters by using the nonlinear deformation model.

13. The system of claim 8, wherein the shape distance is a Chamfer Distance.

14. The system of claim 8, wherein the processing device is to perform further operations comprising:
   determining an updated linear model for the shape space using the updated first subset of the set of registered 3D digital shapes;
   updating the nonlinear deformation model for the shape space using the second subset of the set of registered 3D digital shapes to create an updated nonlinear deformation model;
   projecting a second unregistered shape to the shape space by using the updated linear model to create a second initial registration;
   predicting a second updated registration based on the second initial registration using the updated nonlinear deformation model;
   determining a second shape distance between the second updated registration and the second unregistered shape; and
   adding the second updated registration to the updated first subset of the set of registered 3D digital shapes based on a second shape distance between the second updated registration and the second unregistered shape being below the threshold value to create a further updated first set of registered 3D digital shapes and a further updated estimate of the shape space.

15. A non-transitory computer-readable medium, storing executable instructions, which when executed by a processing device, cause the processing device to perform operations comprising:
   accessing a set of registered three-dimensional (3D) digital shapes, wherein the set of registered 3D digital shapes are registered to a shape template;
   a step for determining a linear model for an estimate of a shape space using a first subset of the set of registered 3D digital shapes;
   a step for obtaining a nonlinear deformation model for the shape space using a second subset of the set of registered 3D digital shapes;
   projecting an unregistered shape to the shape space by using the linear model to create an initial registration for the unregistered shape;
   predicting an updated registration based on the initial registration using the nonlinear deformation model; and
   adding the updated registration to the set of registered 3D digital shapes based on a shape distance between the updated registration and the unregistered shape being below a threshold value for updating the estimate of the shape space to create an updated estimate of the shape space, wherein the updated estimate of the shape space is usable for editing a 3D digital shape.

16. The non-transitory computer-readable medium of claim 15, wherein the shape template is a skinned multi-person linear model (SMPL)-based template, wherein the linear model is a principal component analysis (PCA)-based model, comprising multiple shape eigenvectors, and wherein the nonlinear deformation model is a Neural Jacobian Fields (NJF)-based model.

17. The non-transitory computer-readable medium of claim 15, wherein an initial state of the nonlinear deformation model is determined based on the first subset of the set of registered 3D digital shapes.

18. The non-transitory computer-readable medium of claim 15, wherein projecting the unregistered shape to the shape space by using the linear model further comprises:
   determining a plurality of optimized pose parameters and a plurality of optimized shape coefficients for the unregistered shape; and
   identify a registered shape from the first subset of the set of registered 3D digital shapes best matching the unregistered shape based on the plurality of optimized shape coefficients.

19. The non-transitory computer-readable medium of claim 15, wherein the updated registration is posed to match the unregistered shape based on the plurality of optimized pose parameters by using the nonlinear deformation model.

20. The non-transitory computer-readable medium of claim 15, wherein the executable instructions, which when executed by a processing device, cause the processing device to perform further operations comprising:
- adding the updated registration to the first subset of the set of registered 3D digital shapes to create an updated first subset of the set of registered 3D digital shapes;
- determining an updated linear model for the shape space using the updated first subset of the set of registered 3D digital shapes;
- updating the nonlinear deformation model for the shape space using the second subset of the set of registered 3D digital shapes to create an updated nonlinear deformation model;
- projecting a second unregistered shape to the shape space by using the updated linear model to create a second initial registration;
- predicting a second updated registration based on the second initial registration using the updated nonlinear deformation model;
- determining a second shape distance between the second updated registration and the second unregistered shape; and
- adding the second updated registration to the updated first subset of the set of registered 3D digital shapes based on a second shape distance between the second updated registration and the second unregistered shape being below the threshold value to create a further updated first set of registered 3D digital shapes and a further updated estimate of the shape space.

* * * * *